July 13, 1965  J. H. MORRELL  3,193,931
PARACHUTE SPOTTING DEVICE
Filed June 3, 1964
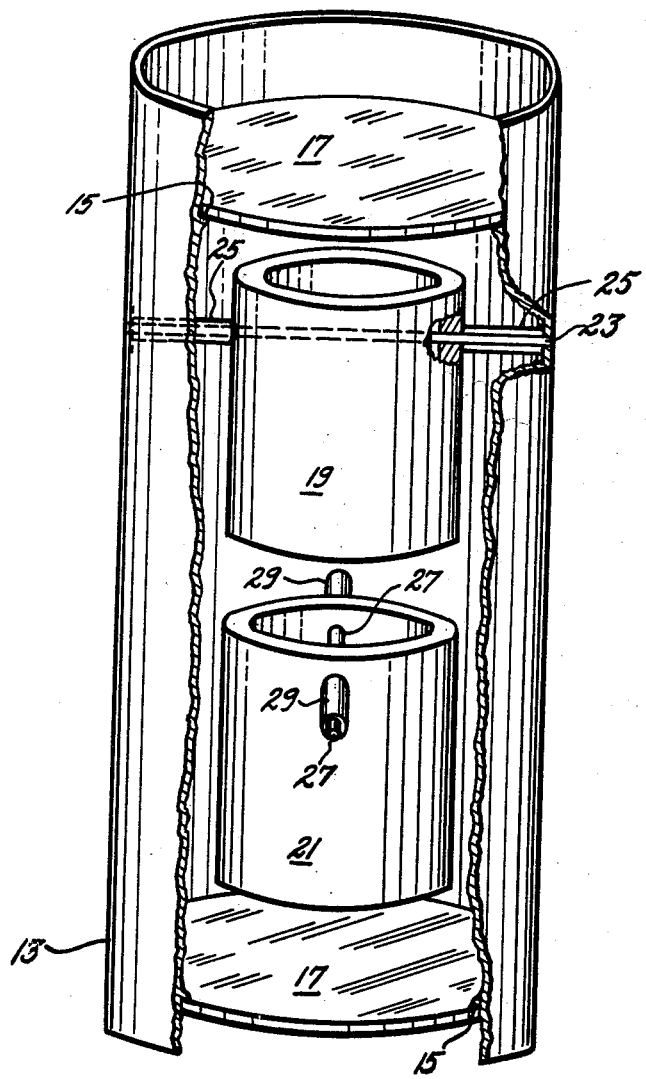
INVENTOR.
JOHN H. MORRELL
BY
ATTORNEYS

United States Patent Office 3,193,931
Patented July 13, 1965

3,193,931
PARACHUTE SPOTTING DEVICE
John H. Morrell, 48 Newton Heights, Leominster, Mass.
Filed June 3, 1964, Ser. No. 372,425
5 Claims. (Cl. 33—46.5)
(Granted under Title 35, U.S. Code (1952), sec. 266)

The invention described herein may be manufactured by or for the United States Government for governmental purposes without payment to me of any royalty thereon.

This invention relates to a spotting device for determining the exact location on the ground over which an aircraft is flying and is more particularly concerned with providing a device whereby a parachutist can accurately spot the point on the ground over which he is flying, thereby permitting him with complete reliability to determine the exact point to exit from the aircraft.

At present, spotting for an exit point by parachutists is generally accomplished by visually locating a point on the ground and from this observation, estimating the proper time and aircraft position from which to jump in order to land in the desired area. However, this method is not always reliable as the slightest error of the sighting angle by the jumper is magnified many times over because of the long distances involved between the aircraft and the ground. Also, the particular attitude of the aircraft at any given time may interject an additional error into the visual sighting angle by the parachutist. Thus, accurate spotting generally becomes a matter of the experience of the parachutist or aircraft pilot, and even highly experienced jumpers often miss their mark as a result of inaccurate spotting caused by incorrect sighting angle.

The invention herein described disclosed a spotting device which is simple to use as well as unusually accurate, and entirely eliminates the possibility of error caused by an incorrect sighting angle by the observer regardless of the attitude of the carrying aircraft at the particular time of sighting.

Accordingly, it is an object of the present invention to provide a simple, easy-to-use device for locating the point on the ground over which an aircraft is flying. No special skills or experience are required by the operator of the device in order to make the necessary determinations.

Another object of the invention is to provide a parachute spotting device which is extremely accurate with little or no chance of error caused by incorrect operation.

A further object of the present invention is to provide a spotting device which is easy and inexpensive to manufacture and requires no unusually accurate parts or equipment. No optically perfect elements are essential and only conventional easily obtainable materials are used in fabricating the device.

Still another object of the invention is to provide a parachute spotting device which is light in weight yet rugged and will not be damaged by normal use. Since the device is not unusually sensitive, periodic adjustments are not generally required once the central axes of the various elements have been aligned.

A still further object of the present invention is to provide a spotting device which can easily be attached to a parachutist's equipment by means of a snap or other suitable fastener and can be easily disengaged when ready for use.

These and other objects, features and advantages will become more apparent when considered in conjunction with the accompanying drawing wherein there is shown an isometric view in partial section of one embodiment of the invention.

Referring now to the drawing, the spotting device includes as its principal element, an elongated tubular casing member 13 having a shoulder portion 15 machined at each end thereof. The casing member 13 is preferably fabricated of aluminum for lightness and strength but may be manufactured from any suitable metal or plastic material. Upper and lower lenses 17 are inserted in the ends of casing member 13 against the shoulders 15 and are fixedly positioned therein. The lenses 17 may be made of clear plastic or glass and are primarily for the purpose of wind protection to prevent movement of pivotable elements located in the spotting device.

Within the tubular casing 13, there are also disposed an upper sight cup 19 and a lower sight cup 21. These elements 19 and 21 are pivotally mounted so that when the spotting device is off the true vertical, the cups 19 and 21 swing out of axial alignment with one another. Pivot rod 23 passes through the upper sight cup 19 across the diameter near its upper edge, each end being fixedly attached to the tubular casing member 13. A pair of spacers 25 are disposed between the outer wall of cup 19 and the inner wall of casing member 13 around each end of the pivot rod 23 for the purpose of positioning the cup 19 in the casing member 13 in such a manner that the central axes of both coincide with each other when the device is in true vertical position. Likewise, the lower sight cup 21 is provided with a pivot rod 27 to allow a swinging movement thereof when the central axis of the sighting device deviates from the vertical. Spacers 29 operate in conjunction with the lower cup 21 as described above with regard to spacers 25 and upper cup 19. The pivot rods 23 and 27 are installed perpendicular to each other and function as crosshairs to assist in locating the exact center of the field of view when using the sighting device as a parachute spotter.

In operation, the parachute spotting device is taken aloft by the parachute jumper and may be attached to the reserve chute so as to be readily available when needed. As the parachutist approaches the drop area, he holds the sighting device in what he believes to be the true vertical position and sights down through the upper lens 17 and the upper and lower sighting cups 19 and 21. Because a much greater portion of the cups 19 and 21 is disposed below the pivot rods 23 and 27, respectively, than above, any deviation from the true vertical causes the gravitational force to impart a swinging movement which angularly displaces the central axis one of one or both of the cups from the central axis of the tubular casing members 13. This deviation becomes apparent to the observer because the cups 19 and 21 no longer being in optical alignment, give the appearance of not being circular when sighting therethrough. By changing the axial direction of the spotting device with respect to the earth until the cups appears as true circles, the parachutist can determine true vertical direction. This occurs when the tubular casing 13 and the upper and lower sighting cups 19 and 21 are axially concentric with one another. The pivot rods 23 and 27 are disposed perpendicular to each other to form cross-hairs the center of which is the exact location on the ground directly over which the aircraft is flying. Since the parachutist know his exact position with respect to the ground, he is able to accurately estimate his exit point from the aircraft based on the other known variable and a safe and accurate jump can be accomplished.

The spotting device herein described is also useful when dropping cargo into a sight area. As in the case of the parachute jumper, the spotting device is used to locate the exact position on the ground over which the aircraft is flying and, after taking into consideration wind and aircraft speed and direction, the cargo can be dropped at the proper time and location so as to land on target.

From the foregoing, it will be seen that the invention has been presented with particular emphasis on a preferred embodiment. It will be apparent to one skilled in the art that certain changes, alterations, modifications and substitutions can be made in the arrangement and location of the various elements without departing from the true spirit and scope of the invention as defined in the appended claims.

Having thus set forth and disclosed the nature of my invention what I claim is:

1. An apparatus for determining true vertical direction comprising an elongated tubular casing member, an upper sight cup pivotably mounted in the upper portion of said casing member, a lower sight cup pivotably mounted in the lower portion of said casing member, said lower cup being positioned so as to pivot in a direction perpendicular to said upper sight cup, said upper and lower sight cups being in axial alignment with one another and with said casing member when said apparatus points in true vertical direction, deviation from true vertical causing said upper and lower sight cups to pivot out of alignment with one another thereby indicating that said tubular casing member is not positioned in the true vertical direction.

2. Sighting apparatus for determining true vertical direction from a point above the earth, said apparatus comprising an elongated tubular casing member, an upper sight cup pivotably mounted in the upper portion of said casing member, an upper pivot rod passing through the upper portion of said upper sight cup, the ends of said upper pivot rod terminating in the wall of said casing member, a lower sight cup pivotably mounted in the lower portion of said casing member, a lower pivot rod passing through the upper portion of said lower sight cup, the ends of lower pivot rod terminating in the wall of said casing member, said upper and lower sight cups being constructed and arranged to pivot perpendicular to each other, said upper and lower sight cups being in axial alignment with one another and with said casing member when said apparatus is pointed in true vertical direction, deviations from true vertical causing said upper and lower sight cups to pivot out of alignment with one another thereby indicating that said tubular casing member is not positioned in the true vertical direction.

3. The sighting apparatus defined in claim 2 including a plurality of spacer members, one spacer member being disposed at each end of each of said upper and lower pivot rods between the outer wall of said sighting cups and the inner wall of said casing member.

4. The sighting apparatus defined in claim 2 including a pair of lens members, one of said lens members being positioned within said casing member above said upper sight cup and the other of said lens members being positioned within said casing member below said lower sight cup.

5. The sighting apparatus defined in claim 2 wherein said upper and lower pivot rods are disposed in perpendicular relationship to one another thereby appearing as cross-hairs to locate the exact center of the field of view when said sighting apparatus is being operated a parachute spotting device.

No references cited.

ISAAC LISANN, *Primary Examiner.*